(12) United States Patent
Hama et al.

(10) Patent No.: US 6,723,785 B2
(45) Date of Patent: Apr. 20, 2004

(54) PROCESS FOR PREPARING AQUEOUS DISPERSION OF PIGMENT-CONTAINING POLYMER PARTICLES

(75) Inventors: Yoshinori Hama, Wakayama (JP); Kenji Kano, Wakayama (JP); Norio Ueyama, Wakayama (JP); Masahiro Umehara, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/904,887

(22) Filed: Jul. 16, 2001

(65) Prior Publication Data

US 2002/0023572 A1 Feb. 28, 2002

(30) Foreign Application Priority Data

Jul. 17, 2000 (JP) ........................................ 2000-216556

(51) Int. Cl.⁷ .......................... C08L 33/02; C08L 33/06; C08L 67/00; C08L 75/00; C09D 11/10
(52) U.S. Cl. ........................ 524/556; 524/590; 524/601; 523/160
(58) Field of Search ................................. 523/160, 161; 106/31.6; 524/556, 590, 601

(56) References Cited

U.S. PATENT DOCUMENTS

| 4,665,107 | A | | 5/1987 | Micale | |
|---|---|---|---|---|---|
| 5,837,754 | A | * | 11/1998 | Shimomura et al. | 523/161 |
| 6,031,019 | A | * | 2/2000 | Tsutsumi et al. | 523/160 |
| 6,031,024 | A | * | 2/2000 | Uraki et al. | 523/161 |
| 6,372,824 | B1 | * | 4/2002 | Song et al. | 523/412 |
| 6,476,102 | B1 | * | 11/2002 | Chung et al. | 523/409 |

FOREIGN PATENT DOCUMENTS

| JP | 62-254833 | 11/1987 |
|---|---|---|
| JP | 8-183920 | 7/1996 |
| JP | 8-218013 | 8/1996 |
| JP | 8-231906 | 9/1996 |

* cited by examiner

*Primary Examiner*—Callie Shosho
(74) *Attorney, Agent, or Firm*—Oblon, Spivak, McClelland, Maier & Neustadt, P.C.

(57) ABSTRACT

A process for preparing an aqueous dispersion of pigment-containing polymer particles, comprising the steps of (A) removing an organic solvent from a mixture (I) comprising an organic solvent solution of a polymer, water and optionally a neutralizing agent to give a solvent-removed product; and (B) subjecting the solvent-removed product obtained in step (A) to a dispersion treatment, wherein a pigment is added to the mixture (I) or the solvent-removed product. The aqueous dispersion of pigment-containing polymer particles can be suitably used for a water-based ink for inkjet printing.

16 Claims, No Drawings

PROCESS FOR PREPARING AQUEOUS DISPERSION OF PIGMENT-CONTAINING POLYMER PARTICLES

BACKGROUND OF THE INVENTION

1. Field of the Invention

The present invention relates to a process for preparing an aqueous dispersion of pigment-containing polymer particles, and more specifically to a process for preparing an aqueous dispersion of pigment-containing polymer particles, which can be suitably used for a water-based ink for inkjet printing, an aqueous dispersion of pigment-containing polymer particles prepared by the above process, and a water-based ink comprising the aqueous dispersion.

2. Discussion of the Related Art

Development of a water-based ink has been desired in order to avoid the global environmental pollution caused by organic solvents. However, there are some defects in a water-based ink containing a water-soluble dye such that the ink is poor in water resistance and light fastness. Inkjet printing is carried out by directly jetting ink droplets from very fine nozzles to deposit the ink droplets on a recording medium, to form characters or images. The inkjet printing is advantageous in that its printing device produces noise at a low level. Also, the inkjet printing is excellent in operability, facilitates coloration and enables to use plain paper as a recording medium. Therefore, the inkjet printing has been widely used in these years.

In an ink used for inkjet printers, water-soluble dyes and polyhydric alcohols are used in order to prevent the ink from being clogged in the nozzles. However, this ink is poor in water resistance and light fastness. Especially, when the ink is used as an ink for thermal jet printing, there are some defects in the ink such that the dye is oxidized due to the heat of a heater, and that the ink is easily scorched on the heater surface, thereby lowering the discharging ability.

A water-based pigment ink has been proposed in order to eliminate this defect. As the water-based pigment ink, there has been proposed a pigment dispersion-type ink prepared by dispersing a pigment in water with a surfactant or a water-soluble polymer. However, there are some defects in the pigment dispersion-type ink such that the ink is insufficient in water resistance and light fastness.

Therefore, as an ink which is excellent in water resistance and light fastness, there has been proposed a pigment-containing ink prepared by incorporating a pigment into a water-insoluble polymer, and dispersing the resulting pigment-incorporated water-insoluble polymer in water.

During the preparation of the pigment-containing ink, the formation of fine particles of a pigment is generally carried out in an organic solvent or a mixed solvent of water and an organic solvent (dispersion treatment), as disclosed in, for instance, Japanese Patent Laid-Open Nos. Hei 8-183920 and Hei 8-218013. When this ink is prepared, a roll-mill, a beads-mill, a high-pressure homogenizer or the like has been used as a dispersion device.

However, there are some defects in the above process such that as materials used in the device, particularly a packing, ones which endure the organic solvent used should be selected in accordance with the kinds of the organic solvent, and that the durability of the packing for the organic solvent is generally poorer as compared to that for water.

Also, when the dispersion device is disassembled for washing, there are necessitated the prevention of evaporation of an organic solvent or collection of an organic solvent from a waste liquid obtained by washing. Moreover, there arises a defect in working environment such that the organic solvent would impart wrong influences to human bodies (for instance, skin, throat, or the like) when the organic solvent is contacted with skin or orally inhaled upon evaporation.

In addition, when a roll-mill is used, there are some defects in the roll-mill such that a treated product is dried because an organic solvent is evaporated from its roller surface, and that working environment is stained. When a beads-mill or a high-pressure homogenizer is used, there are some defects such that an entire device including a feeding tank and a manufactured product tank should be tightly sealed in order to prevent evaporation of an organic solvent contained in the treatment solution, and that an explosion-proof device should be provided for an electric motor or the like.

As described above, when an organic solvent is contained in a dispersion treatment liquid, equipments and means for handling the organic solvent are necessitated for from small-scale experimental equipments to large-scale industrial production equipments. Therefore, there has been desired the development of a water-based dispersion in which an organic solvent is not used.

Therefore, there has been proposed a process comprising dispersing a solid polymer in water, adding a pigment to the resulting dispersion and subjecting the mixture to a dispersion treatment as disclosed in Japanese Patent Laid-Open No. Hei 8-231906. However, there are some defects in this process such that the solid polymer is not dispersed in water unless it has an appropriate composition, and that heating or dispersion treatment with a stronger dispersion device is additionally necessitated in order to disperse the solid polymer in water, thereby making its industrial productivity poor.

As mentioned above, a process which does not necessitate an organic solvent at all is idealistic. However, the realization of such a process is actually difficult. Therefore, the polymer must be used in the form of a solution of an organic solvent in order to disperse the water-insoluble polymer in water, and effectively contact the water-insoluble polymer with a pigment. At a final stage, the organic solvent is removed. As mentioned above, when an organic solvent is used during the dispersion treatment, it would be difficult to deal with the organic solvent because a complicated apparatus is necessitated. Therefore, there has been desired for developing a process for preparing an aqueous dispersion not using an organic solvent in a dispersion process, which can remove the organic solvent in a process easily removing the organic solvent with a relatively convenient apparatus prior to the dispersion process.

An object of the present invention is to provide a process for efficiently preparing an aqueous dispersion of pigment-containing polymer particles without using an organic solvent in a dispersion step, giving no crookedness to a printed matter, and having excellent water resistance.

Another object of the present invention is to provide an aqueous dispersion of pigment-containing polymer particles prepared by the above process.

Still another object of the present invention is to provide a water-based ink comprising the above aqueous dispersion.

These and other objects of the present invention will be apparent from the following description.

SUMMARY OF THE INVENTION

According to the present invention, there are provided:

(1) a process for preparing an aqueous dispersion of pigment-containing polymer particles, comprising the steps of:
  (A) removing an organic solvent from a mixture (I) comprising an organic solvent solution of a polymer, water and optionally a neutralizing agent to give a solvent-removed product; and
  (B) subjecting the solvent-removed product obtained in step (A) to a dispersion treatment, wherein a pigment is added to the mixture (I) or the solvent-removed product;

(2) a process for preparing an aqueous dispersion of pigment-containing polymer particles, comprising the steps of:
  (C) mixing an organic solvent solution of a polymer, water and optionally a neutralizing agent with each other to give a mixture (II);
  (D) removing an organic solvent from the mixture (II) obtained in step (C);
  (E) mixing a solvent-removed product obtained in step (D) with a pigment to give a mixture (III); and
  (F) subjecting the mixture (III) obtained in step (E) to a dispersion treatment;

(3) a process for preparing an aqueous dispersion of pigment-containing polymer particles, comprising the steps of:
  (G) mixing an organic solvent solution of a polymer, water, pigment and optionally a neutralizing agent with each other to give a mixture (IV);
  (H) removing an organic solvent from the mixture (IV) obtained in step (G) to give a solvent-removed product; and
  (I) subjecting the solvent-removed product obtained in step (H) to a dispersion treatment;

(4) a process for preparing an aqueous dispersion of pigment-containing polymer particles, comprising the steps of:
  (C) mixing an organic solvent solution of a polymer, water and optionally a neutralizing agent with each other to give a mixture (II);
  (K) mixing the mixture (II) obtained in step (C) with a pigment to give a mixture (VI);
  (L) removing an organic solvent from the mixture (VI) obtained in step (K) to give a solvent-removed product; and
  (M) subjecting the solvent-removed product obtained in step (L) to a dispersion treatment;

(5) a process for preparing an aqueous dispersion of pigment-containing polymer particles, comprising the steps of:
  (N) mixing an organic solvent solution of a polymer with a pigment to give a mixture (VII);
  (O) mixing the mixture (VII) obtained in step (N), water and optionally a neutralizing agent with each other to give a mixture (VIII);
  (P) removing an organic solvent from the mixture (VIII) obtained in step (O) to give a solvent-removed product; and
  (Q) subjecting the solvent-removed product obtained in step (P) to a dispersion treatment;

(6) an aqueous dispersion of pigment-containing polymer particles obtained by the process of any one of items (1) to (5) above; and (7) a water-based ink composition comprising the aqueous dispersion of pigment-containing polymer particles of item (6) above.

DETAILED DESCRIPTION OF THE INVENTION

As a polymer used for the organic solvent solution of a polymer, there can be used a water-insoluble polymer which can incorporate a pigment. Examples of the polymer include vinyl-based polymers, polyester-based polymers, polyurethane-based polymers, and the like. Among these polymers, the vinyl-based polymers are preferable. The vinyl-based polymer includes a polymer prepared by polymerizing at least one monomer selected from the group consisting of styrene, (meth)acrylic acid and (meth)acrylic acid ester. It is preferable that the weight-average molecular weight of the polymer is 3000 to 50000, from the viewpoints of increasing durability of an ink after printing and preventing the scorching on printer heads of inkjet printers in a water-based ink for inkjet printing.

It is preferable that the polymer has a salt-forming group. In this case, a neutralizing agent for neutralizing the polymer having a salt-forming group can be employed as occasion demands.

As the neutralizing agent, an acid or a base can be used in accordance with the kind of the salt-forming group. The acid includes inorganic acids such as hydrochloric acid and sulfuric acid; and organic acids such as acetic acid, propionic acid, lactic acid, succinic acid, glycolic acid, gluconic acid, glycerol carboxylic acids. The base includes tertiary amines such as trimethylamine and triethylamine; ammonia, sodium hydroxide, potassium hydroxide and the like. The amount of the neutralizing agent is not limited to specified ones. It is preferable that the amount of the neutralizing agent is adjusted so that the resulting aqueous dispersion becomes usually neutral, for instance, pH 4.5 to 9.

The organic solvent is preferably an alcohol-based solvent, a ketone-based solvent, an ether-based solvent, an aromatic hydrocarbon-based solvent, an aliphatic hydrocarbon-based solvent, or a halogenated aliphatic hydrocarbon-based solvent, and more preferably a hydrophilic organic solvent.

The alcohol-based solvent includes methanol, ethanol, isopropanol, n-butanol, tert-butanol, isobutanol, diacetone alcohol, and the like. The ketone-based solvent includes acetone, methyl ethyl ketone, diethyl ketone, methyl isobutyl ketone, and the like. The ether-based solvent includes dibutyl ether, tetrahydrofuran, dioxane, and the like. The aromatic hydrocarbon-based solvent includes benzene, toluene, and the like. The aliphatic hydrocarbon-based solvent includes heptane, hexane, cyclohexane, and the like. The halogenated aliphatic hydrocarbon-based solvent includes methylene chloride, 1,1,1-trichloroethane, chloroform, carbon tetrachloride, 1,2-dichloroethane, and the like. Among them, acetone and methyl ethyl ketone are preferable.

The concentration of the polymer in the organic solvent solution of the polymer is not limited to specified ones. It is preferable that the concentration is usually about 1 to about 60% by weight.

It is desired that the amount of water is 100 to 1000 parts by weight, preferably 200 to 500 parts by weight, based on 100 parts by weight of the organic solvent used for the organic solvent solution of the polymer to form an aqueous continuous phase.

The pigment can be any of known inorganic pigments and organic pigments. In addition, those pigments can be used together with an extender as occasion demands.

The inorganic pigment includes carbon black, metal oxides, metal sulfides, metal chlorides and the like. Among them, carbon black is preferable for a black water-based ink. The carbon black includes furnace black, thermal lamp black, acetylene black, channel black and the like.

The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

The extender includes silica, calcium carbonate, talc and the like.

It is desired that the amount of the pigment is 50 to 700 parts by weight, preferably 80 to 400 parts by weight, more preferably 80 to 200 parts by weight, based on 100 parts by weight of the solid content of the polymer, from the viewpoints of printed density and facilitation for containing the pigment in the polymer particles.

Next, each of the preparation processes will be explained below.

Process A

In Process A, first, an organic solvent is removed from a mixture (I) comprising an organic solvent solution of a polymer, water and optionally a neutralizing agent in step (A), to give a solvent-removed product.

The mixture (I) can be obtained by mixing an organic solvent solution of a polymer, water and optionally a neutralizing agent with each other with an ordinary agitator such as an anchor impeller or a turbine impeller.

The process for removing the organic solvent from the mixture (I) is not limited to specified ones. As the process for removing the organic solvent, distillation under reduced pressure is preferable, and thin film distillation under reduced pressure is more preferable. The amount of the organic solvent removed is not limited to specified ones. Usually, it is preferable that the entire amount of the organic solvent is removed from the mixture (I).

Next, the solvent-removed product is subjected to step (B). According to step (B), the solvent-removed product obtained in step (A) is subjected to dispersion treatment. During the dispersion treatment, there can be used a ball-mill, a roll-mill, a beads-mill, a high-pressure homogenizer, a high-speed agitation-type dispersion device, or the like. Among them, the high-pressure homogenizer is preferable since the amount of inorganic impurities contaminated can be reduced.

The high-pressure homogenizer includes those comprising a chamber having a fixed flow path of a treatment solution, those comprising a homogenizing valve, the width of a flow path for a treatment solution of which is adjustable, and the like. The high-pressure homogenizer comprising a chamber having a fixed flow path for a treatment solution includes Microfluidizer (trade name) commercially available from Microfluidics International Corporation; Nanomizer (trade name) commercially available from Nanomizer; Ultimizer (trade name) commercially available from Suginomachine, and the like. The high-pressure homogenizer comprising a homogenizing valve, the width of a flow path for a treatment solution of which is adjustable includes High-Pressure Homogenizer (trade name) commercially available from Rannie; High-Pressure Homogenizer (trade name) commercially available from Sanmaru Kikai Kogyo K.K.; High-Pressure Homogenizer (trade name) commercially available from Izumi Food Machinery; and the like.

The pressure during the dispersion with the high-pressure homogenizer is preferably not less than 50 MPa, more preferably not less than 80 MPa, because the polymer particles having a desired particle diameter can be readily obtained in a short period of time.

In Process A, a pigment is added to the mixture (I) or the solvent-removed product, and the resulting mixture is stirred. The stirring can be carried out by using a high-speed rotary agitation device such as a disperser.

Thus, an aqueous dispersion of pigment-containing polymer particles is obtained by Process A.

Process B

In Process B, first, an organic solvent solution of a polymer, water and optionally a neutralizing agent are mixed with each other in step (C) to give a mixture (II). The mixing method is not limited to specified ones. The mixing method can be carried out by using an ordinary agitator such as an anchor impeller or a turbine impeller; or a high-speed rotary agitation device such as a disperser.

Next, the mixture (II) is subjected to step (D). According to step (D), the organic solvent is removed from the mixture (II) obtained in step (C) to give a solvent-removed product.

The process for removing the organic solvent from the mixture (II) is not limited to specified ones. As the process for removing an organic solvent, distillation under reduced pressure is preferable, and thin film distillation under reduced pressure is more preferable.

The solvent-removed product is subjected to step (E). According to step (E), the solvent-removed product obtained in step (D) is mixed with a pigment to give a mixture (III).

The mixing of the solvent-removed product with the pigment can be carried out by using a high-speed rotary agitation device such as a disperser.

Next, the mixture (III) is subjected to step (F). According to step (F), the mixture (III) obtained in step (E) is subjected to a dispersion treatment.

This dispersion treatment can be carried out in the same manner as in step (B) of Process A.

Thus, an aqueous dispersion of pigment-containing polymer particles is obtained by Process B.

Process C

In Process C, first, an organic solvent solution of a polymer, water, a pigment and optionally a neutralizing agent are mixed with each other in step (G), to give a mixture (IV). This step (G) can be carried out in the same manner as in step (E) of Process B.

Next, the mixture (IV) obtained in step (G) is subjected to step (H).

According to step (H), the organic solvent is removed from the mixture (IV), to give a solvent-removed product. This step (H) can be carried out in the same manner as in step (D) of Process B.

The solvent-removed product obtained in step (H) is then subjected to step (I).

According to step (I), the solvent-removed product obtained in step (H) is subjected to a dispersion treatment. The dispersion treatment can be carried out in the same manner as in step (B) of Process A.

Thus, an aqueous dispersion of pigment-containing polymer particles is obtained by Process C.

Process D

In Process D, first, an organic solvent solution of a polymer, water, and optionally a neutralizing agent are mixed with each other in step (C), to give a mixture (II). This mixing can be carried out in the same manner as in step (C) of Process B.

Next, the mixture (II) is subjected to step (K). According to step (K), the mixture (II) obtained in step (C) is mixed with a pigment, to give a mixture (VI). The mixing of the mixture (II) with the pigment can be carried out in the same manner as in step (E) of Process B.

The mixture (VI) is subjected to step (L). According to step (L), the organic solvent is removed from the mixture (VI) obtained in step (K), to give a solvent-removed product. The removal of the organic solvent can be carried out in the same manner as in step (D) of Process B.

Subsequently, the solvent-removed product is subjected to step (M). According to step (M), the solvent-removed product obtained in step (L) is subjected to dispersion treatment. The dispersion treatment can be carried out in the same manner as in step (B) of Process A.

Thus, an aqueous dispersion of pigment-containing polymer particles is obtained by Process D.

Process E

In Process E, first, an organic solvent solution of a polymer is mixed with a pigment in step (N), to give a mixture (VII). This mixing of the organic solvent solution of a polymer with the pigment can be carried out in the same manner as in step (C) of Process B.

Next, the mixture (VII) is subjected to step (O). According to step (O), the mixture (VII) obtained in step (N), water, and optionally a neutralizing agent are mixed with each other, to give a mixture (VIII). This mixing can be carried out in the same manner as in step (E) of Process B.

Subsequently, the mixture (VIII) is subjected to step (P). According to step (P), the organic solvent is removed from the mixture (VIII) obtained in step (O), to give a solvent-removed product. The removal of the organic solvent can be carried out in the same manner as in step (D) of Process B.

The solvent-removed product obtained in step (P) is then subjected to step (Q). According to step (Q), the solvent-removed product is subjected to dispersion treatment. The dispersion treatment of the solvent-removed product can be carried out in the same manner as in step (B) of Process A.

Thus, an aqueous dispersion of pigment-containing polymer particles is obtained by Process E.

The average particle diameter of the polymer particles contained in the aqueous dispersion of pigment-containing polymer particles is preferably 0.01 to 0.50 μm, more preferably 0.02 to 0.20 μm, from the viewpoints of prevention of the generation of bleeding out of the water-based ink and dispersion stability. As occasion demands, coarse particles can be removed from the aqueous dispersion by means of centrifugation, filtration with a filter, or the like. Since the aqueous dispersion can be used as the water-based ink without any further treatments, the process for preparing an aqueous dispersion of the present invention can be a process for preparing a water-based ink comprising the aqueous dispersion of pigment-containing polymer particles.

When the aqueous dispersion of the present invention is used for a water-based ink, it is desired that the content of the pigment-containing polymer particles in the water-based ink is usually 1 to 30% by weight, preferably 2 to 15% by weight, from the viewpoints of printed density and jetting stability of a water-based ink for inkjet printing.

When the water-based ink is prepared from the aqueous dispersion of pigment-containing polymer particles of the present invention, there can be added additives such as a wetting agent, a dispersant, a defoaming agent, a mildew-proof agent and a chelating agent.

EXAMPLES

The units "parts" as used in Preparation Example, each Example and each Comparative Example are based upon weight unless noted otherwise.

Preparation Example

A reaction vessel was charged with 20 parts of methyl ethyl ketone; and initially charged monomers comprising 7.5 parts of styrene, 3 parts of n-dodecyl methacrylate, 10 parts of N,N-dimethylaminoethyl methacrylate, 20 parts of methoxy-terminated polyethylene glycol(n=4) methacrylate commercially available from Shin-Nakamura Chemical Co., Ltd. under the trade name of NK ESTER M40G, 5 parts of styrenic macromer commercially available from TOAGOSEI CO., LTD. under the trade name of AS-6, which is a styrene macromer having a number-average molecular weight of 6000 and a polymerizable function group of methacryloyloxy group and 0.2 parts of mercaptoethanol. The reaction vessel was subjected to sufficient nitrogen gas replacement.

On the other hand, a dropping funnel was charged with 7.5 parts of styrene, 5 parts of n-dodecyl methacrylate, 15 parts of N,N-dimethylaminoethyl methacrylate, 20 parts of methoxy-terminated polyethylene glycol(n=4) methacrylate, 5 parts of styrenic macromer commercially available from TOAGOSEI CO., LTD. under the trade name of AS-6, which is a styrene macromer having a number-average molecular weight of 6000 and a polymerizable function group of methacryloyloxy group, 1.8 parts of mercaptoethanol, 60 parts of methyl ethyl ketone and 1.2 parts of 2,2'-azobis(2,4-dimethylvaleronitrile). The reaction vessel was subjected to sufficient nitrogen gas replacement.

The mixed solution in the dropping funnel was heated to 65° C. under nitrogen atmosphere, and gradually added dropwise to the reaction vessel over a period of 3 hours, with stirring the mixed solution in the reaction vessel. After 2 hours passed from the termination of the dropwise addition, a solution prepared by dissolving 0.3 parts of 2,2'-azobis(2,4-dimethylvaleronitrile) in 5 parts of methyl ethyl ketone (hereinafter referred to as MEK) was added thereto. The mixture was further matured at 65° C. for 2 hours and then at 70° C. for 2 hours, to give a copolymer solution.

A copolymer was isolated by drying a part of the resulting copolymer solution at 105° C. under reduced pressure for 2 hours to remove the solvent, and its weight-average molecular weight was determined by gel permeation chromatography using polystyrene as a standard substance and tetrahydrofuran as a solvent. As a result, the weight-average molecular weight was 15000.

The resulting copolymer solution was dried under reduced pressure, to give a copolymer A.

Example 1 (Preparation Process B)

Five parts of the copolymer A obtained in Preparation Example was dissolved in 5 parts of MEK, and 20 parts of ion-exchanged water and 5.2 parts of a 30% by weight aqueous gluconic acid solution were added to the solution. The mixture was blended with anchor impellers for 30 minutes, to give a milky white mixture (II). Fifteen parts of ion-exchanged water was further added to the resulting mixture (II), and the mixture was stirred. Thereafter, the organic solvent and a part of water were removed at 60° C. under reduced pressure, to give an organic solvent-removed product B, the solid content of which was 20% by weight.

Five parts by weight of carbon black commercially available from Cabot Corporation, under the trade name of Monarch 880 was added to 33 parts of the organic solvent-removed product B. The mixture was blended with a disperser for 1 hour, to give a mixture (III).

Next, the resulting mixture (III) was subjected to 5-pass dispersion treatment under the pressure of 120 MPa with Microfluidizer commercially available from Microfluidics International Corporation. In the dispersion treatment, a raw material supplying vessel and a treated product receiving vessel were open systems, a packing was one which was not solvent-resistant, and a non-explosion proof electric motor was used (hereinafter referred to the same in other Examples and Comparative Examples). As a result, the organic solvent was non-volatile, so that the workability was excellent.

The resulting dispersion was filtered with a 50 mL needle-less syringe commercially available from TERUMO CORPORATION equipped with a filter having an average pore diameter of 5 μm (made of acetyl cellulose membrane, outer diameter: 25 mm, commercially available from Fuji Photo Film Co., Ltd.) to remove coarse particles. Ion-exchanged water was further added thereto, to give an aqueous dispersion of pigment-containing polymer particles, the solid content of which was 20% by weight.

Example 2 (Preparation Process C)

Five parts of the copolymer A obtained in Preparation Example was dissolved in 5 parts of MEK. Five parts by weight of carbon black commercially available from Cabot Corporation, under the trade name of Monarch 880, 20 parts of ion-exchanged water and 5.2 parts of a 30% by weight aqueous gluconic acid solution were added to the solution. The mixture was blended with a disperser for 1 hour, to give a mixture. Fifteen parts of ion-exchanged water was further added to the resulting mixture, and the mixture was stirred. Thereafter, the organic solvent and a part of water were removed at 60° C. under reduced pressure, to give an organic solvent-removed product C, the solid content of which was 30% by weight.

Next, the organic solvent-removed product C was subjected to 5-pass dispersion treatment under the pressure of 120 MPa with Microfluidizer commercially available from Microfluidics International Corporation.

The resulting dispersion was treated in the same manner as in Example 1, to give an aqueous dispersion of pigment-containing polymer particles.

Example 3 (Preparation Process D)

Five parts by weight of carbon black commercially available from Cabot Corporation, under the trade name of Monarch 880 was added to the mixture (II) obtained in the same manner as in Example 1, and the mixture was stirred. Thereafter, the organic solvent and a part of water were removed at 60° C. under reduced pressure, to give an organic solvent-removed product D, the solid content of which was 30% by weight.

Next, the organic solvent-removed product D was subjected to 5-pass dispersion treatment under the pressure of 120 MPa with Microfluidizer commercially available from Microfluidics International Corporation.

The resulting dispersion was treated in the same manner as in Example 1, to give an aqueous dispersion of pigment-containing polymer particles.

Example 4 (Preparation Process E)

Five parts of the copolymer A obtained in Preparation Example was dissolved in 15 parts of MEK, and 5 parts by weight of carbon black commercially available from Cabot Corporation, under the trade name of Monarch 880 was further added thereto. The mixture was blended with a disperser for 30 minutes, to give a mixture (VII). Twenty parts of ion-exchanged water and 5.2 parts of a 30% by weight aqueous gluconic acid solution were added to the mixture (VII), and the mixture was blended with a disperser for additional 30 minutes, to give a mixture (VIII).

Next, 50 parts of ion-exchanged water was further added to 50 parts of the mixture (VIII), and the resulting mixture was stirred. Thereafter, the organic solvent and a part of water were removed at 60° C. under reduced pressure, to give an organic solvent-removed product, the solid content of which was 20% by weight.

Next, the organic solvent-removed product was subjected to 5-pass dispersion treatment under the pressure of 120 MPa with Microfluidizer commercially available from Microfluidics International Corporation. In this case, the workability was as excellent as that in Example 1.

The resulting dispersion was treated in the same manner as in Example 1, to give an aqueous dispersion of pigment-containing polymer particles.

Comparative Example 1

The mixture (IV) obtained in the same manner as in Example 2 was subjected to 5-pass dispersion treatment under the pressure of 120 MPa with Microfluidizer commercially available from Microfluidics International Corporation without carrying out a solvent-removing treatment. During the dispersion treatment, since the MEK evaporated from a vessel for supplying a raw material and a vessel for receiving a treated product of the Microfluidizer, an organic solvent-shielding mask was put on. Further, since the packing of the plunger was deteriorated, a new packing for exchange was necessitated. Therefore, the workability was poor.

Twenty parts of ion-exchanged water was added to 40 parts of the resulting dispersion, and the mixture was stirred. Thereafter, the organic solvent was removed at 60° C. under reduced pressure. Further, the coarse particles were removed in the same manner as in Example 1, to give an aqueous dispersion of a pigment-containing polymer particles, the solid content of which was 20% by weight.

The resulting dispersion was treated in the same manner as in Example 1, to give an aqueous dispersion of pigment-containing polymer particles.

Comparative Example 2

Five parts of the copolymer obtained in Preparation Example and 5.2 parts of a 50% by weight aqueous gluconic acid solution were added to 20 parts of ion-exchanged water. The mixture was blended with a disperser for 30 minutes, but the copolymer could not be dispersed therein.

There were mixed together 40 parts of each of the aqueous dispersions obtained in Examples 1 to 4 and Comparative Example 1, 50 parts of glycerol, 10 parts of urea, 1 part of acetylene glycol-polyethylene oxide adduct commercially available from Kawaken Fine Chemicals Co., Ltd. under the trade name of Acetylenol EH and 44 parts of ion-exchanged water. The resulting liquid mixture was filtered with a 25 mL needle-less syringe commercially available from TERUMO CORPORATION equipped with a filter having an average pore diameter of 5 μm (made of acetyl cellulose membrane, outer diameter: 2.5 mm, commercially available from Fuji Photo Film Co., Ltd.), to give a water-based ink.

As the physical properties of the resulting water-based inks, crookedness of printed matter, water resistance, dispersion stability and average particle diameter were evaluated in accordance with the following methods. Dispersion stability and average particle diameter were evaluated for an aqueous dispersion, the solid content of which was 20% by weight. The results are shown in Table 1.

(1) Crookedness of Printed Matter

A bubble-jet printer commercially available from HEWLETT PACKARD Co., under the model number of Desk Jet 720C was filled with a water-based ink. Thereafter, a test document including ruled lines was printed, and a degree of crookedness of printed ruled lines was evaluated by naked eyes. The evaluation criteria are as follows:

Evaluation Criteria

⊚: no crookedness of printed ruled lines

○: almost no crookedness of printed ruled lines

Δ: slight no crookedness of printed ruled lines x: crookedness of printed ruled lines (2) Water Resistance Solid image printing was carried out with the above printer on a commercially available copy sheet, and dried at 25° C. for 1 hour. The printed density of the specified printed portion of the obtained sample was determined, and thereafter the printed copy paper was immersed in stand-still water for 10 seconds, and the paper was lifted vertically therefrom. After air-drying the paper at 25° C. for 24 hours, the printed density of the same printed portion as that before immersion was measured, and the residual ratio was calculated by the following equation:

$$[\text{Residual Ratio }(\%)] = \frac{[\text{Printed Density After Immersion}]}{[\text{Printed Density Before Immersion}]} \times 100$$

The water resistance was evaluated on the basis of the following evaluation criteria:

Evaluation Criteria

○: residual ratio being not less than 95%

Δ: residual ratio being not less than 85% and less than 95% x: residual ratio being less than 85%

(3) Dispersion Stability

A screwed-neck test tube having an entire length of 160 mm and an external diameter of 16.5 mm was charged with 20 ml of a 20% by weight aqueous dispersion, was allowed to stand and stored in a thermostat at 60° C. which was set up in a test tube stand for one month. A 1 ml sample each was collected from an upper layer and a lower layer in the test tube, and its absorbance was determined with an apparatus for measuring absorbance commercially available from Shimadzu Corporation under the trade name of UV-265F). The ratio of the absorbance of the upper layer to that of the lower layer was calculated. The dispersion stability evaluated on the basis of the following evaluation criteria:

Evaluation Criteria

⊚: ratio of absorbance being not less than 97%

○: ratio of absorbance being not less than 95% and less than 97%

Δ: ratio of absorbance being not less than 85% and less than 95% x: ratio of absorbance being less than 85%

(4) Average Particle Diameter

The average particle diameter was determined with a COULTER N4 commercially available from Coulter, Inc.

TABLE 1

| | Ink | | | Aqueous Dispersion of Pigment-Containing Polymer Particles | |
|---|---|---|---|---|---|
| Ex. No. | Crookedness of Printed Character | Water Resistance | Dispersion Stability | Average Particle Diameter (nm) | Workability at Dispersion |
| 1 | ○ | ○ | ○ | 135 | Excellent |
| 2 | ○ | ○ | ○ | 130 | Excellent |
| 3 | ○ | ○ | ⊚ | 130 | Excellent |
| 4 | ○ | ○ | ⊚ | 128 | Excellent |
| Comp. Ex. No. | | | | | |
| 1 | ○ | ○ | Δ | 130 | Poor |
| 2 | | | Not Dispersed | | |

It can be seen from the results shown in Table 1 that the aqueous dispersion comprising pigment-containing polymer particles, being excellent in workability and dispersion stability is obtained in each Example, so that the ink prepared from the aqueous dispersion comprising pigment-containing polymer particles does not have crookedness in the printed matter and is excellent in water resistance.

What is claimed is:

1. A process for preparing an aqueous dispersion of pigment-containing polymer particles, comprising the steps of:
    (A) removing an organic solvent from a mixture (I) comprising an organic solvent solution of a polymer, water and optionally a neutralizing agent by distillation under reduced pressure to give a solvent-removed product; and
    (B) subjecting the solvent-removed product obtained in step (A) to a dispersion treatment,
    wherein a pigment is added to the mixture (I) or the solvent-removed product.

2. The process according to claim 1, wherein said organic solvent is at least one solvent selected from the group consisting of methanol, ethanol, isopropanol, n-butanol, tert-butanol, isobutanol, diacetone alcohol, acetone, methyl ethyl ketone, diethyl ketone, methyl isobutyl ketone, dibutyl ether, tetrahydrofuran, dioxane, benzene, toluene, heptane, hexane, cyclohexane, methylene chloride, 1,1,1-trichloroethane, chloroform, carbon tetrachloride, and 1,2-dichloroethane.

3. A process for preparing an aqueous dispersion of pigment-containing polymer particles, comprising the steps of:
    (C) mixing an organic solvent solution of a polymer, water and optionally a neutralizing agent with each other to give a mixture (II);
    (D) removing the organic solvent from the mixture (II) obtained in step (C);
    (E) mixing a solvent-removed product obtained in step (D) with a pigment to give a mixture (III); and
    (F) subjecting the mixture (III) obtained in step (E) to a dispersion treatment.

4. An aqueous dispersion of pigment-containing polymer particles obtained by the process of claim 3.

5. A water-based ink composition comprising the aqueous dispersion of pigment-containing polymer particles of claim 4.

6. The process according to claim 3, wherein said organic solvent is at least one solvent selected from the group consisting of methanol, ethanol, isopropanol, n-butanol, tert-butanol, isobutanol, diacetone alcohol, acetone, methyl ethyl ketone, diethyl ketone, methyl isobutyl ketone, dibutyl ether, tetrahydrofuran, dioxane, benzene, toluene, heptane, hexane, cyclohexane, methylene chloride, 1,1,1-trichloroethane, chloroform, carbon tetrachloride, and 1,2-dichloroethane.

7. A process for preparing an aqueous dispersion of pigment-containing polymer particles, comprising the steps of:
- (G) mixing an organic solvent solution of a polymer, water, pigment and optionally a neutralizing agent with each other to give a mixture (IV);
- (H) removing the organic solvent from the mixture (IV) obtained in step (G) by distillation under reduced pressure to give a solvent-removed product; and
- (I) subjecting the solvent-removed product obtained in step (H) to a dispersion treatment.

8. The process according to claim 7, wherein said organic solvent is at least one solvent selected from the group consisting of methanol, ethanol, isopropanol, n-butanol, tert-butanol, isobutanol, diacetone alcohol, acetone, methyl ethyl ketone, diethyl ketone, methyl isobutyl ketone, dibutyl ether, tetrahydrofuran, dioxane, benzene, toluene, heptane, hexane, cyclohexane, methylene chloride, 1,1,1-trichloroethane, chloroform, carbon tetrachloride, and 1,2-dichloroethane.

9. A process for preparing an aqueous dispersion of pigment-containing polymer particles, comprising the steps of:
- (C) mixing an organic solvent solution of a polymer, water and optionally a neutralizing agent with each other to give a mixture (II);
- (K) mixing the mixture (II) obtained in step (C) with a pigment to give a mixture (VI);
- (L) removing the organic solvent from the mixture (VI) obtained in step (K) to give a solvent-removed product; and
- (M) subjecting the solvent-removed product obtained in step (L) to a dispersion treatment.

10. An aqueous dispersion of pigment containing polymer particles obtained by the process of claim 9.

11. A water-based ink composition comprising the aqueous dispersion of pigment-containing polymer particles of claim 10.

12. The process according to claim 9, wherein said organic solvent is at least one solvent selected from the group consisting of methanol, ethanol, isopropanol, n-butanol, tert-butanol, isobutanol, diacetone alcohol, acetone, methyl ethyl ketone, diethyl ketone, methyl isobutyl ketone, dibutyl ether, tetrahydrofuran, dioxane, benzene, toluene, heptane, hexane, cyclohexane, methylene chloride, 1,1,1-trichloroethane, chloroform, carbon tetrachloride, and 1,2-dichloroethane.

13. A process for preparing an aqueous dispersion of pigment-containing polymer particles, comprising the steps of:
- (N) mixing an organic solvent solution of a polymer with a pigment to give a mixture (VII);
- (O) mixing the mixture (VII) obtained in step (N), water and optionally a neutralizing agent with each other to give a mixture (VIII);
- (P) removing the organic solvent from the mixture (VIII) obtained in step (O) by distillation under reduced pressure to give a solvent-removed product; and
- (Q) subjecting the solvent-removed product obtained in step (P) to a dispersion treatment.

14. An aqueous dispersion of pigment-containing polymer particles obtained by the process of any one of claims 1 to 13.

15. A water-based ink composition comprising the aqueous dispersion of pigment-containing polymer particles of claim 14.

16. The process according to claim 13, wherein said organic solvent is at least one solvent selected from the group consisting of methanol, ethanol, isopropanol, n-butanol, tert-butanol, isobutanol, diacetone alcohol, acetone, methyl ethyl ketone, diethyl ketone, methyl isobutyl ketone, dibutyl ether, tetrahydrofuran, dioxane, benzene, toluene, heptane, hexane, cyclohexane, methylene chloride, 1,1,1-trichloroethane, chloroform, carbon tetrachloride, and 1,2-dichloroethane.

* * * * *